May 17, 1949. A. W. WALKER 2,470,121
AUTOMATICALLY CONTROLLED MARKER TO RECORD MOVEMENT
AND MEANS TO PROVIDE RELATIVE VALUES
Filed July 1, 1944 15 Sheets-Sheet 3

Inventor
Asa W. Walker
By Parker, Crothers & Farmer,
his Attorneys

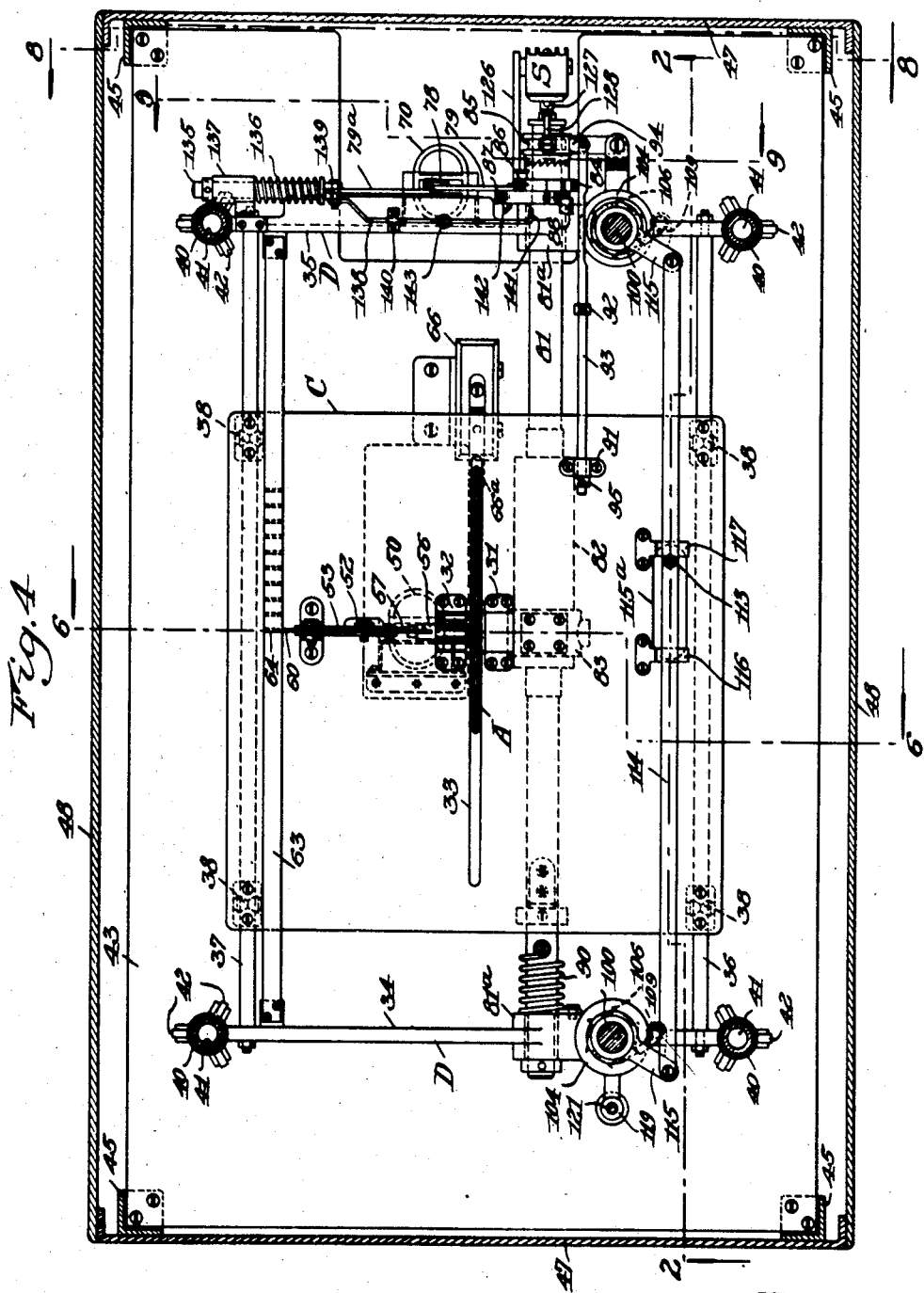

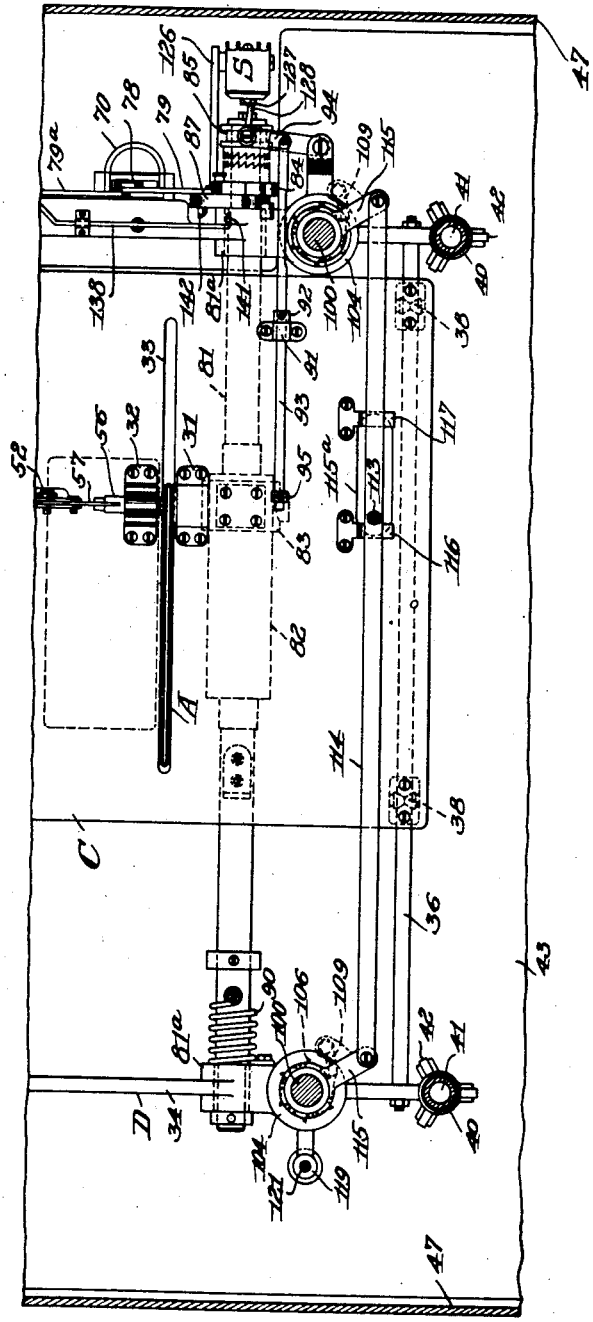

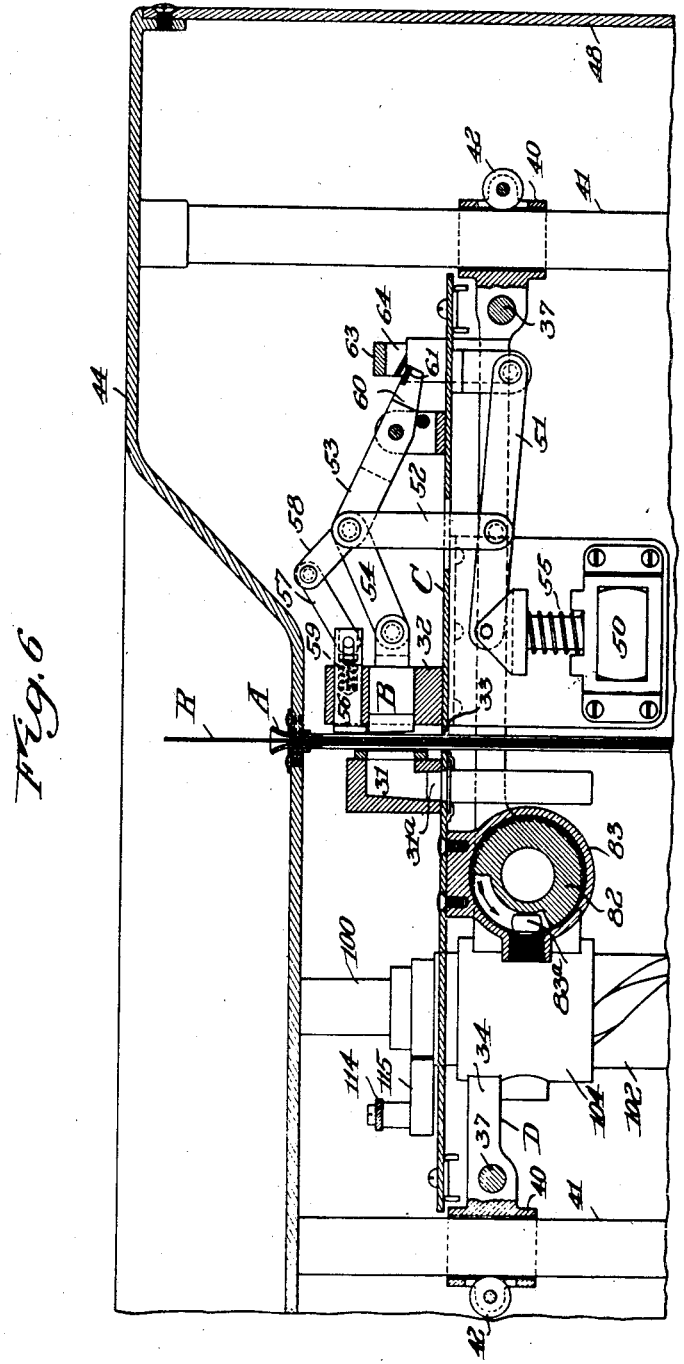

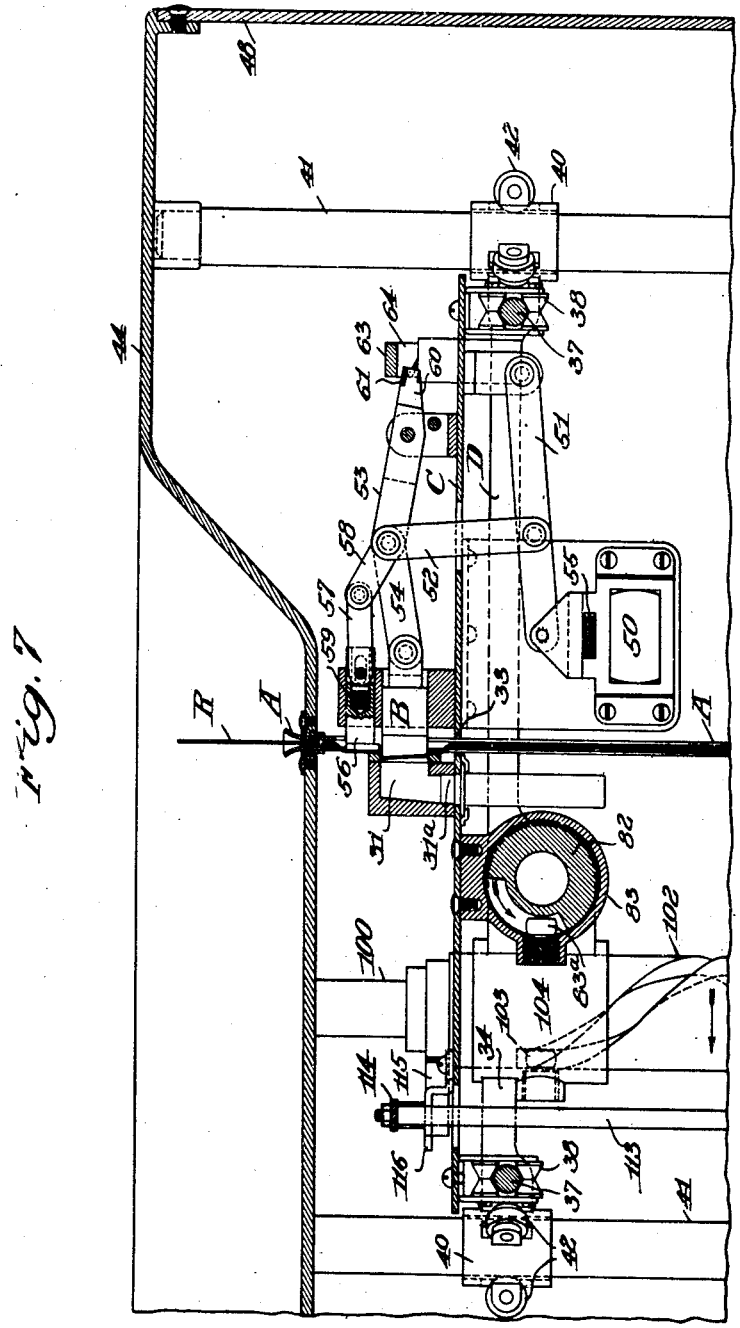

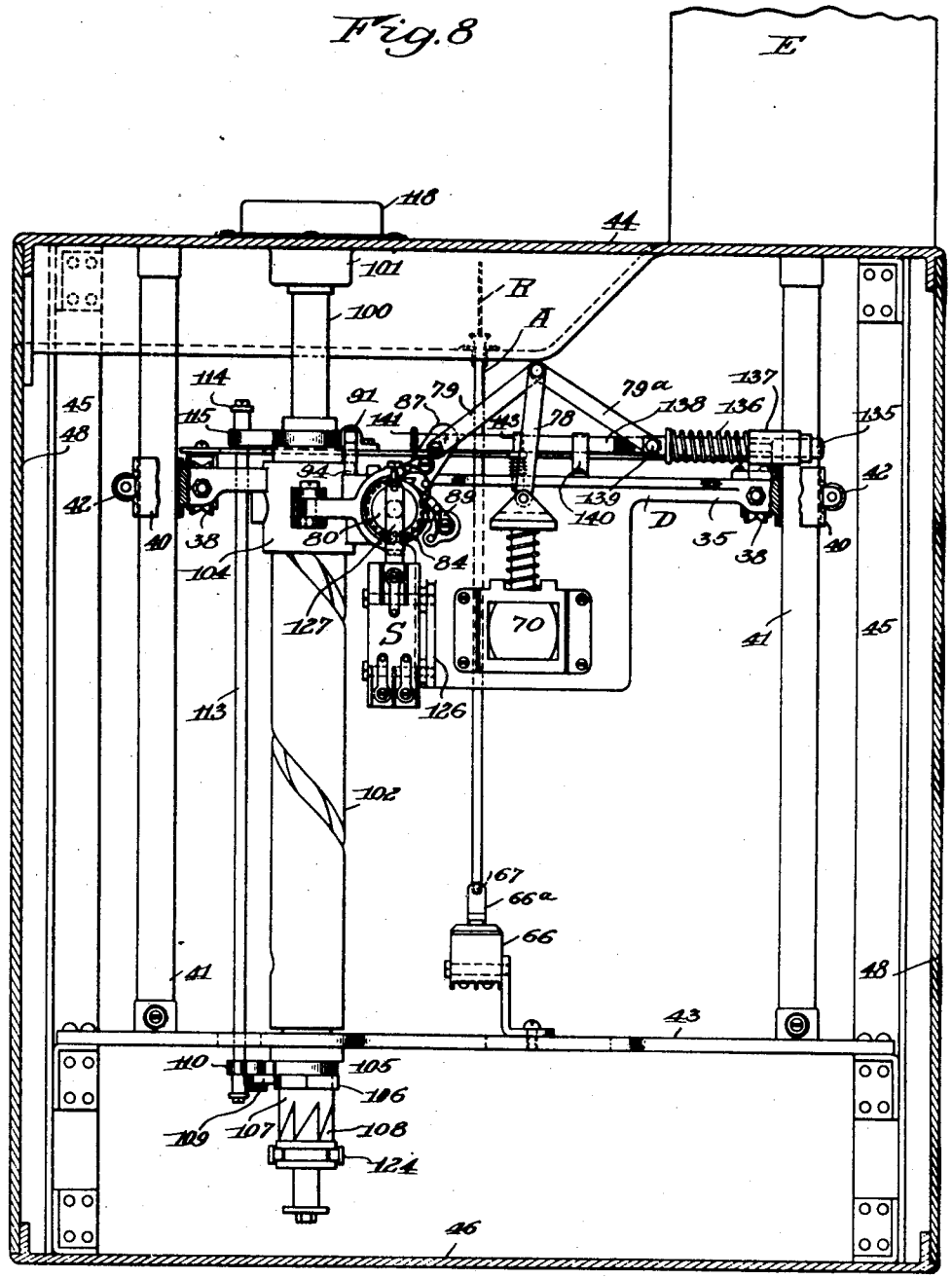

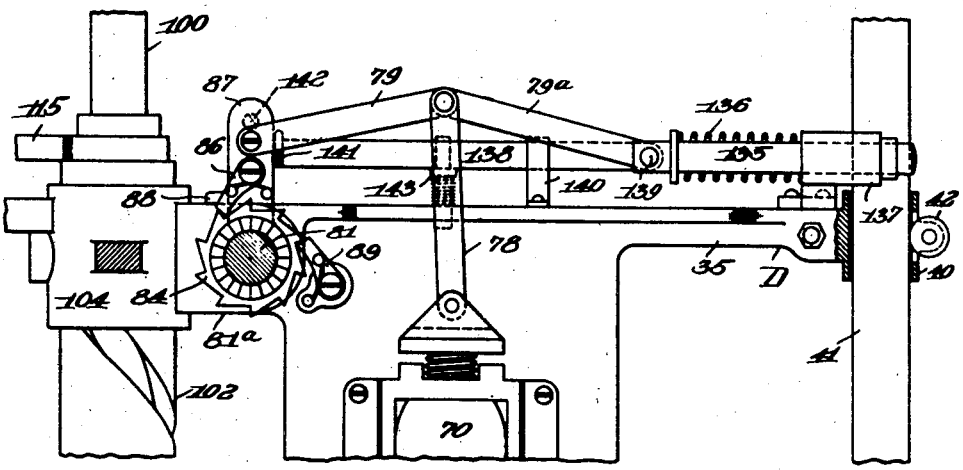
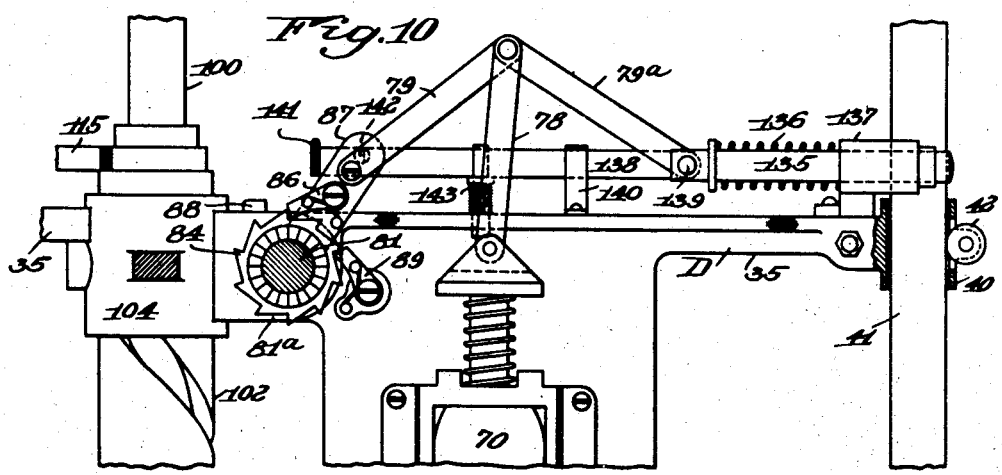

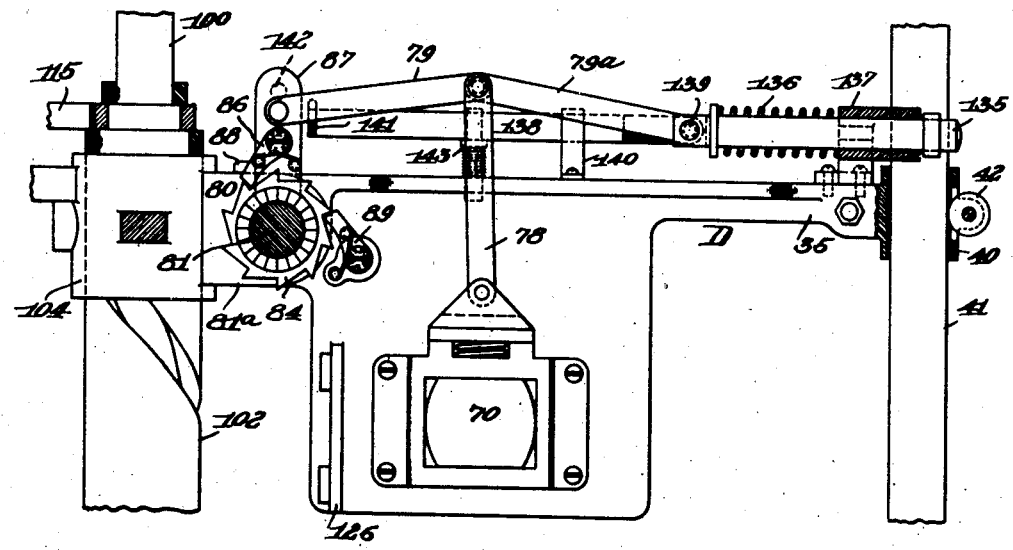

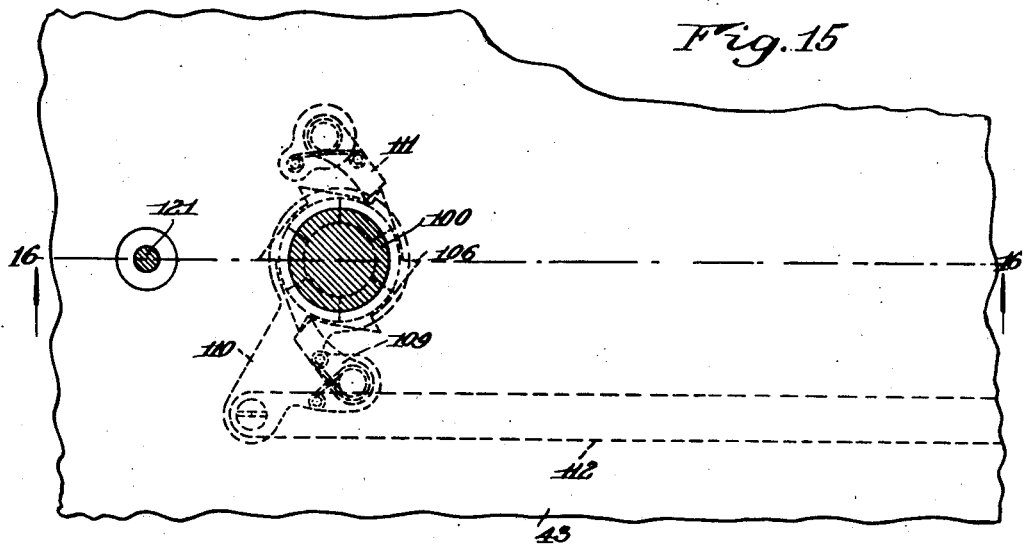
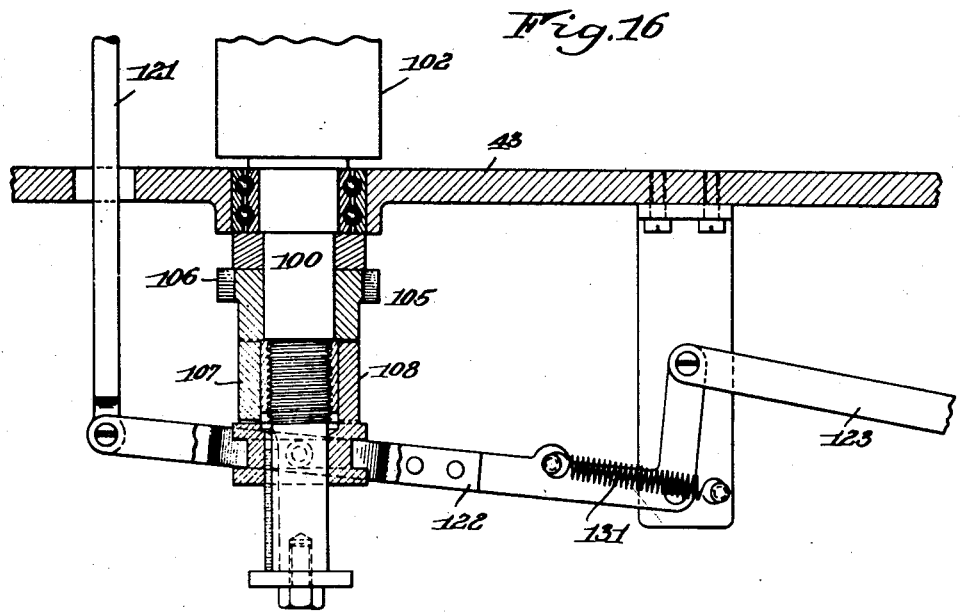
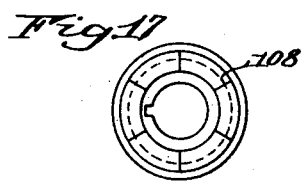

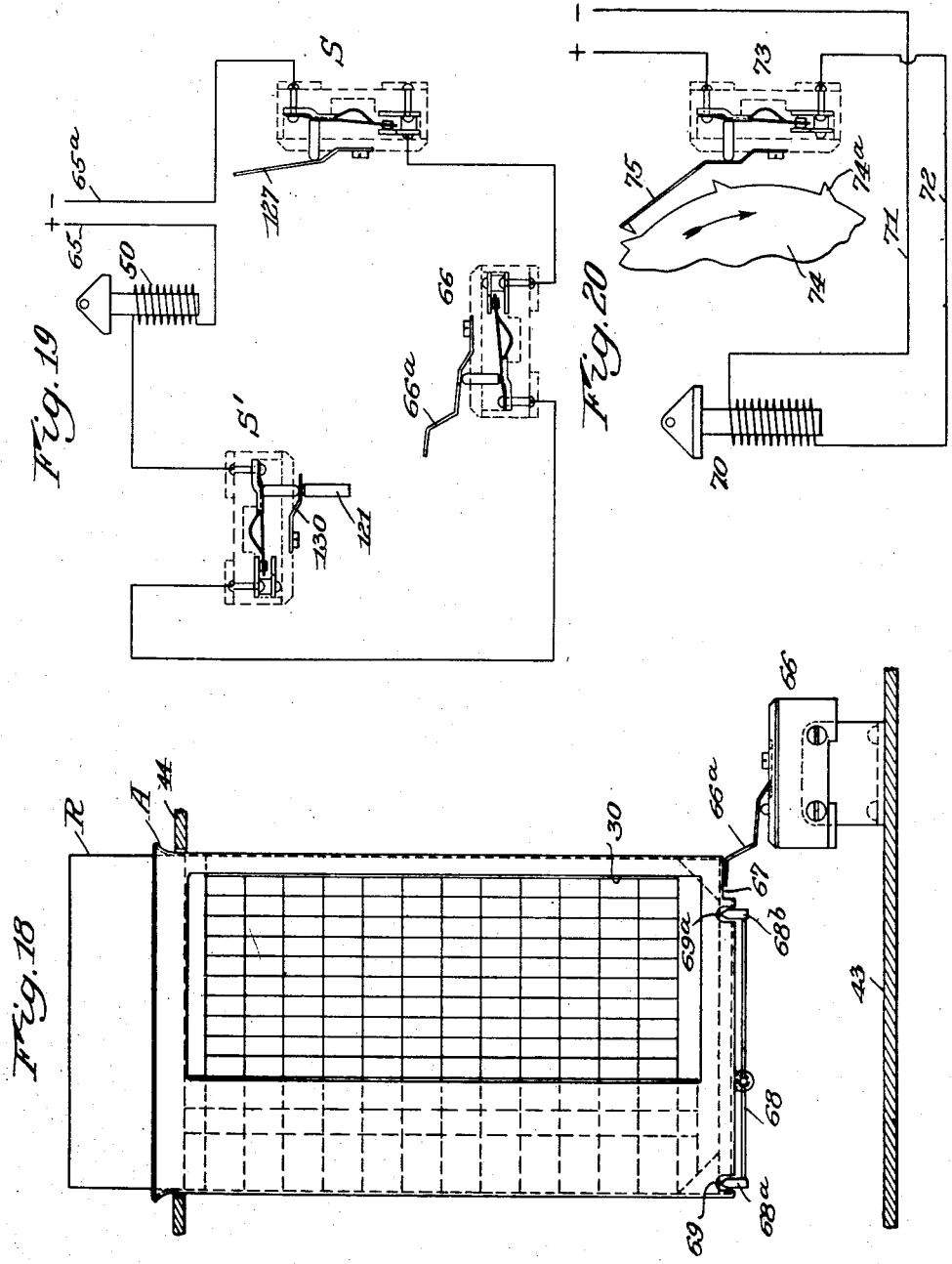

May 17, 1949.  A. W. WALKER  2,470,121
AUTOMATICALLY CONTROLLED MARKER TO RECORD MOVEMENT
AND MEANS TO PROVIDE RELATIVE VALUES
Filed July 1, 1944  15 Sheets-Sheet 15

Inventor
Asa W. Walker
By Parker Prochnow Farmer
his Attorneys

Patented May 17, 1949

2,470,121

UNITED STATES PATENT OFFICE 2,470,121

AUTOMATICALLY CONTROLLED MARKER TO RECORD MOVEMENT AND MEANS TO PROVIDE RELATIVE VALUES

Asa W. Walker, Buffalo, N. Y.

Application July 1, 1944, Serial No. 543,178

21 Claims. (Cl. 346—63)

This invention relates to means for ascertaining amounts, such as periods of time involved in connection with work, or other operations or performances, and the values thereof according to any of various rates or factors of computation.

Wherever elapsed time has a monetary value, there exists a difficult or tedious problem of ascertaining the lengths of time periods and their values according to various different prescribed rates or factors. The known methods or means for accomplishing such results require repeated calculations with given factors, and are therefore slow and laborious and, due in part to the illegibility of the records used, or difficulty in reading them, involve frequent inaccuracies. The determining of elapsed time periods, whether hand or mechanically recorded, and their values, by such methods presents an unusual mathematical problem. This is so, whether the record is made according to hours or minutes, or hours and decimal fractions of hours, and especially so when any time to be determined runs from A. M. to P. M., or from P. M. to A. M. While my invention is especially desirable for use in readily acertaining the amounts of time, and the monetary values of the same, required by workmen in performance of jobs or work, it is also applicable to various other more or less analogous purposes.

One object of the invention is to lessen the mental and mechanical calculations, and the time involved therein, required for ascertaining elapsed time periods and their values according to any particular rate or factor.

Another object of the invention is to provide a novel, improved means and method for accomplishing such results.

Additional objects of the invention are to increase the legibility and facilitate the reading of the records used; to enable the simultaneous making of identical, multiple records; to make possible the ready ascertainment of elapsed time or the value of elapsed time, or time periods, whether they be productive or unproductive, of labor, machines or processes; and to insure the maximum of accuracy, speed, dependability, legibility and economy in ascertaining the solutions of such problems.

Further objects and advantages of the invention will appear from the following specification of the preferred embodiment of the invention, shown in the accompanying drawings, and the novel features of the invention are set forth in the appended claims.

In said drawings:

Fig. 4 is a sectional plan view of the apparatus on line 4—4, Fig. 2.

Fig. 5 is a fragmentary, similar view showing the position of the parts when the punch has reached the limit of its transverse advance travel.

Fig. 6 is a fragmentary, sectional elevation on line 6—6, Fig. 4, showing the punch and its actuating mechanism, with the punch in its retracted position.

Fig. 7 is a similar view showing the punch advanced and in the hole in the record card.

Fig. 8 is a transverse, sectional elevation of the apparatus on line 8—8, Fig. 4.

Figs. 9 and 10 are sectional elevations on line 9—9, Fig. 4, showing the ratchet mechanism for effecting the advance travel of the punch carriage, Fig. 10 showing the normal or inactive position of the parts, and Fig. 9 their position when the ratchet has turned the ratchet wheel one step.

Fig. 11 is a similar view illustrating another position of the parts.

Fig. 12 is a sectional plan view of the parts shown in Fig. 11.

Fig. 15 is a sectional plan view, enlarged, on line 15—15, Fig. 2, showing the ratchet device for producing the vertical travel of the main carriage.

Fig. 16 is a sectional elevation thereof on line 16—16, Fig. 15.

Fig. 17 is a plan view of the clutch sleeve of the ratchet mechanism shown in Figs. 15 and 16.

Fig. 18 is a sectional elevation of the card holder illustrating means for preventing operation of the punch when a card is improperly placed in the holder.

Fig. 19 is a diagrammatic view of the electrical operating circuit, with its safety control switches for the punch operating solenoid.

Fig. 20 is a diagrammatic view of the solenoid for effecting the travel of the punch carriage and its electrical operating circuit and control means.

Fig. 21 is a face view of one of the charts with tabulated figures showing elapsed time periods and the values thereof at a given rate.

Fig. 22 is a face view of a record card or blank after being punched in the punching apparatus.

Fig. 23 is a view showing a punched card in registered position on the chart to show the elapsed time periods and values according to the record punchings of the card.

Figure 1:
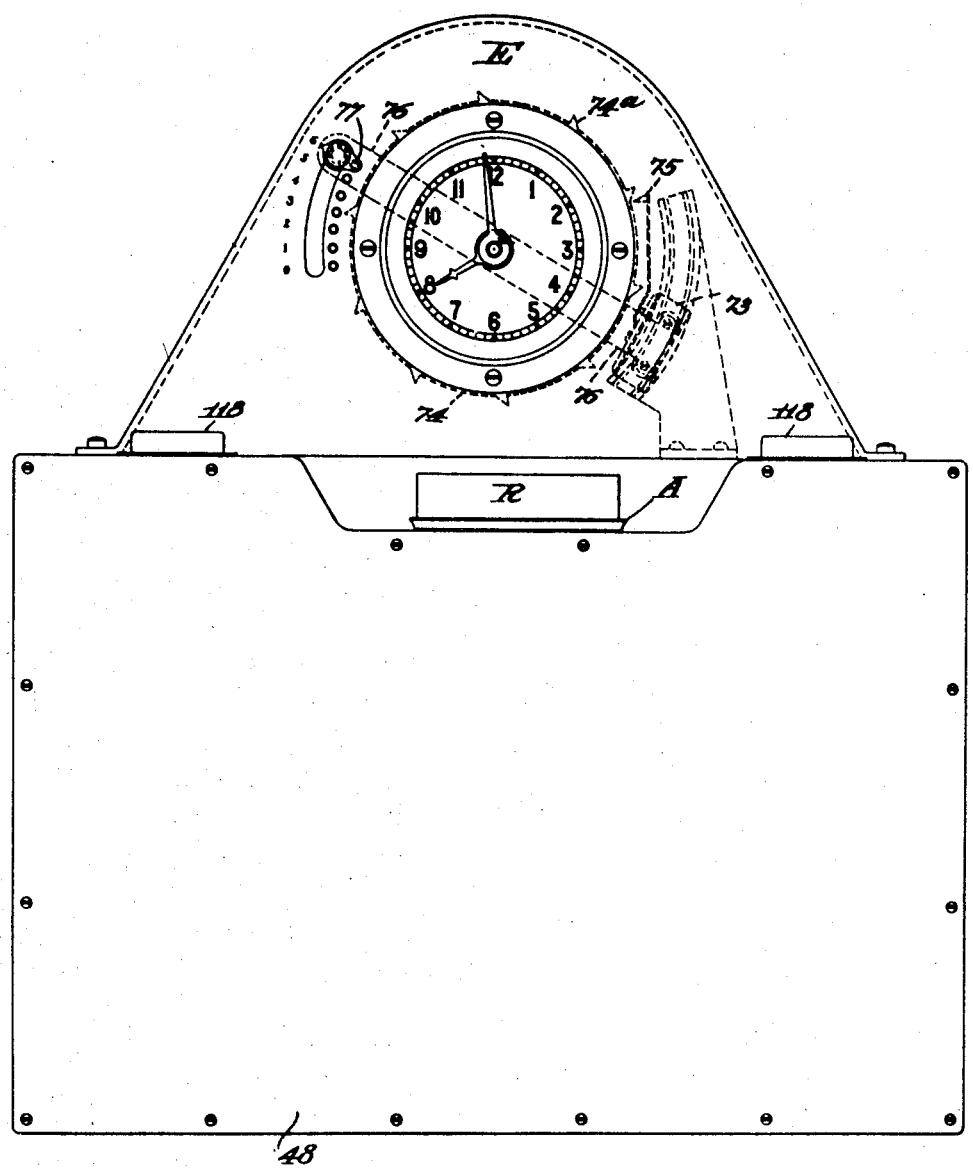
Fig. 1 is a front face, elevational view of an apparatus embodying my invention.

An important use of my method and apparatus of this application is for accounting purposes for readily ascertaining the elapsed times that workmen are occupied in work, either regular day work, overtime or piecework jobs, and the wages due them therefor, according to any prescribed rate or basis of pay, and for the sake of clarity of description, the apparatus as it will now be described, is more particularly intended for such purposes. However, it is to be understood that my invention is not restricted in application to such uses, but is applicable to various different purposes, as will be more definitely pointed out elsewhere herein.

Briefly stated, the apparatus for such purposes comprises a holder or receiver in or on which a workman inserts or places a time or job card or analogous record blank or element when he commences and when he finishes a job or period of work; a punch, marker or element for punching or otherwise marking the record element; means, preferably in the form of a motor-actuated mechanism set in action by the placing of the record element in or on the holder, for effecting a relative movement between the punch or marker and the record element to cause the punching or marking thereof; and time-controlled mechanism which produces a change in the operative, positional relationship between the record element and the punch or marker, so that the holes or marks are made in different, definite locations on the record element, preferably disposed relatively both transversely and lengthwise thereof, depending upon the particular times at which the record element is punched or marked; whereby the elapsed time occurring between different punchings or markings as indicated by the record element, and the value thereof, can be ascertained by placing said record element in a prescribed relation to an appropriate chart on which are shown, in a tabulated arrangement, properly correlated with the time period locations of the record element, elapsed time and value figures computed according to the particular rate or factor at which the work represented by the record element is performed.

In the preferred embodiment of the apparatus, illustrated in the drawings, the holder for the record card is stationary, and the punch is actuated for punching the card, and it is also the punch which is shifted to different operative relations to the card under time control for differently locating the holes in the card, depending upon the times at which the card is punched, so that the card holder remains in a constant position and it is only necessary for the workmen always to place the card in like position in a holder of fixed position, but manifestly, movement of the card toward the punch for punching it and the shifting of the card to different operative positions relatively to the punch for determining the location of the hole in the card according to the time of punching would be obvious reversals of the preferred embodiment illustrated, and such reversals come within the purview of my invention.

Figures 21, 22:
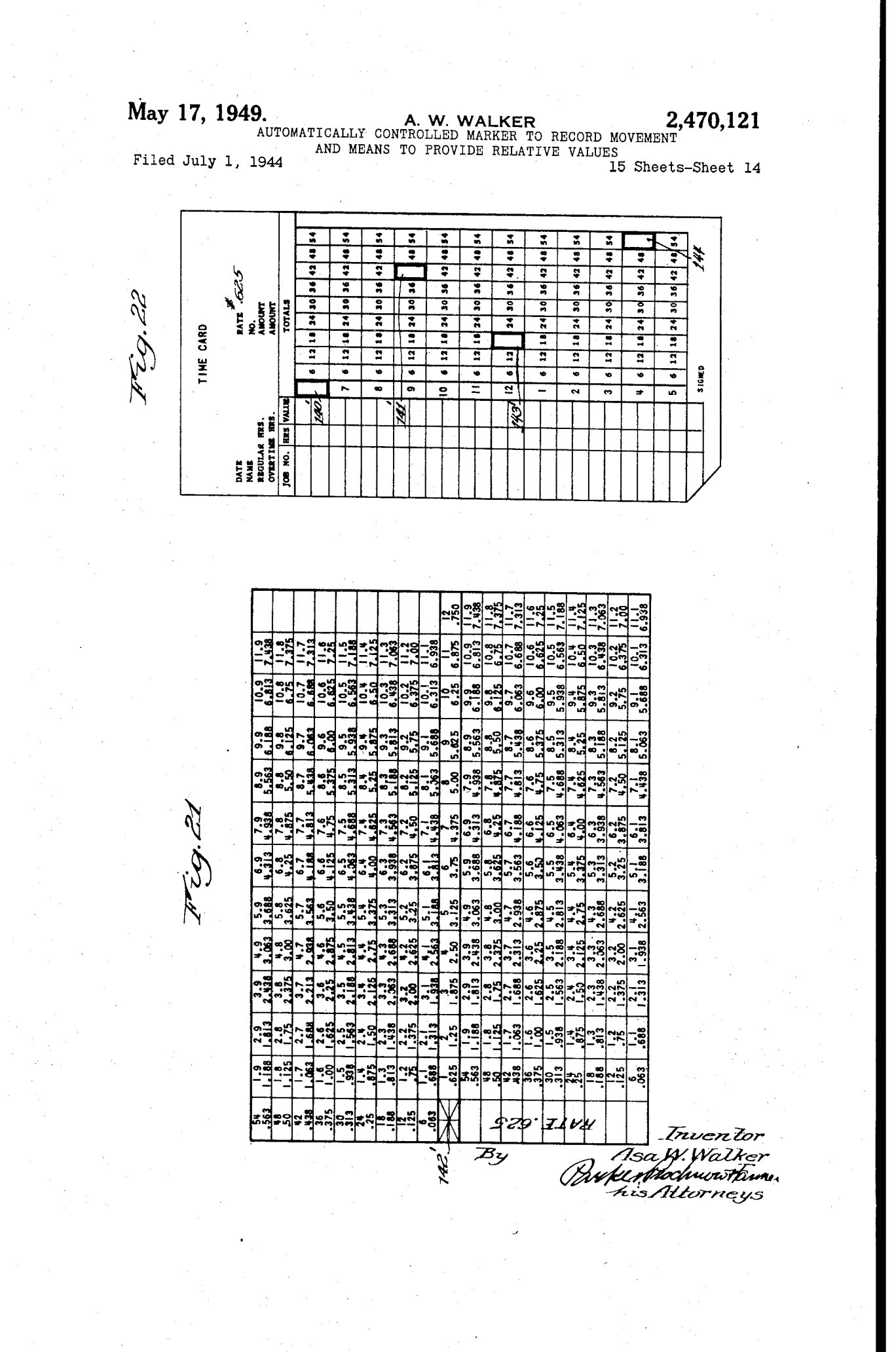

Referring to the drawings, A represents the holder or receiver for the record card or element, indicated at R, and B represents the punch. The holder A is suitably mounted in fixed position on the stationary frame of the apparatus and preferably is in the form of a vertical, thin tube or pocket of a width and thickness adapted to receive and hold the card in a substantially stationary, vertical position, with the upper end of the card projecting somewhat out of the open, upper end or mouth of the holder to facilitate ready insertion of the card into the intended position in the holder and its ready removal therefrom. The holder A has large openings 30 in its opposite, wide walls through which is exposed a large area of the card so that the punch can operate on any portion of this area to enable the holes to be made in any required spaced locations transversely and lengthwise of the area. This area in the card shown (see Fig. 22) is ruled to divide the same into transverse and longitudinal rows of rectangular spaces or divisions, the successive horizontal rows representing successive work hours, indicated by the figures in the left-hand vertical column, and the spaces in successive vertical rows representing successive equal fractions or divisions of the hours which may be indicated by figures in the spaces, and may be one-tenth hour, or six minute periods, in conformity with accepted practice in computing fractional hour work periods. However, it is not essential for the card to be thus ruled to show the spaces in which the punch will locate the holes to indicate the times of punching, since the locations will be determined by the operation of the time-controlled means of the apparatus. Also any other desired fractional division of the hours, instead of the tenth-hour periods shown could, of course, be adopted, by obvious appropriate modifications of the card and control means.

The punch B (Figs. 6 and 7) and a cooperating relatively stationary die 31 are located respectively in rear and in front of and adjacent to the card in the holder A in position for the punch to press the card against the die and pass through the card into a punch hole in the die when punching the card. The punch may reciprocate in a guide hole in a block 32. This guide block and the die 31 are suitably fixed on a carriage or support C which is mounted to travel horizontally or transversely relatively to the card in holder A on a main carriage D, which in turn is mounted on the main frame to travel vertically, or in a direction at right angles to the direction of movement of the punch carriage C. Thus, by adjustment of the punch carriage C horizontally on the main carriage and adjustment of the main carriage D vertically, the punch can be operatively located to punch the card in any intended location transversely and longitudinally of the card. The punch hole in the die is shown connecting with a descending passage 31a for the discharge of the pieces punched out of the card.

As shown, the punch carriage is formed by a horizontal plate provided with a slot 33 through which the card holder extends to allow the relative adjustments of the carriage, and the main carriage D comprises opposite end castings or members 34 and 35 rigidly connected by parallel front and rear connecting bars 36 and 37, on which latter the punch carriage C is movably mounted, preferably by means of grooved rollers 38 arranged to roll against the top and bottom of the connecting bars 37 to properly guide and insure free, easy movement of the punch carriage on the main carriage.

Main carriage D is shown as provided at its four corners with sleeves 40 which surround and are movable along four stationary vertical posts 41, the carriage D being preferably guided in its up and down travel on said posts by rollers 42 journalled on the sleeves 40 and arranged to roll against the posts in paths distributed around each post, so as to accurately guide and insure free travel of the carriage on the posts. As shown, these posts 41 are fixed at their lower ends to a horizontal frame plate 43 and at their upper ends to a top plate 44, which plates are stationarily secured to and connected by upright corner frame members 45 secured at their lower ends on a bottom plate 46. Said bottom plate 46 and top plate 44 may, as shown, form the bottom and top of an enclosing case for the working parts of the apparatus, which case may be completed by end walls or plates 47 and front and rear walls 48, which may be removable to afford access to the parts within the case.

50 represents a motor for actuating the punch B to perforate the record card. Any motor suitable for the purpose may be employed. As shown, see Figs. 6 and 7, it is an electric solenoid which is mounted on the punch carriage, and the movable core of which it suitably connected, as by a lever 51 and link 52 to the knee of a toggle joint, comprising a link 53 suitably fulcrumed on the punch carriage C, and a second link 54 pivoted to the shank of the punch B. When the solenoid is energized, its core will be moved to straighten the toggle joint and to advance the punch so as to cut a hole in the card in the holder A. Preferably, the cutting end of the punch is of rectangular shape to form a rectangular hole in the card approximately the size of a space division of the card, and is inclined so that the punch will have a shearing action in punching the card in order thereby to reduce the power necessary to punch the holes in the card. The punch is retracted when the solenoid 50 is deenergized, by suitable means, such as an expansion coil spring 55 surrounding the solenoid core.

A device 56 is provided for clamping or holding the record element stationary while being punched, said device, as shown, consisting of a plunger which is moved toward and from the card in a guide hole in the punch guide block 32 by a link 57 connected to an extension 58 of the toggle link 53. Link 57 has a pin and slot connection with the clamp plunger and acts against an expansion spring 59 confined in a socket in the clamp plunger, so that when the solenoid is energized to actuate the punch, the toggle arm 58 acting through the link 57 will compress the spring 59 and move the clamp plunger in advance of the punch to press and hold the card against the face of the punch die 31 (see Fig. 7). The spring 59 permits continued movement of the punch by the toggle after holding engagement of the clamp plunger with the card, to allow the punch to pass through the card. During the retraction of the punch, the spring 59 will hold the clamp plunger 56 against the card until the punch has been pulled out of the hole in the card to thus strip the card from the punch and prevent a possible shifting of the card during the retraction of the punch, which might mutilate the edges of the punched hole.

As before stated, the punch is shifted to different operative locations relatively to the record element by movement of the carriages C and D. In order to insure uniform spacing of such locations and also to prevent the possibility of the punch being shifted by the time control adjusting means at any time when the punch is in engagement with the card, locking means for the punch is provided which may be constructed as follows: The toggle link 23 is provided with a locking arm 60, Figs. 4 and 7, having a bevelled edge 61, which projects toward a horizontal locking bar 63 fixed on the main carriage D and extending over the punch carriage C, parallel to its direction of travel, in rear of the punch-actuating toggle. This locking bar is provided in its underside with uniformly spaced vertical notches 64 which may be slightly flared at their bottom ends. When the punch is in any of its card-punching positions, the locking arm 60 of the toggle link will be located below and in register with one of the notches in locking bar 63, and when the toggle is straightened to actuate the punch, locking arm 60 will enter the registering notch 64 and thus prevent lateral shifting movement of the punch carriage C. The locking arm is not withdrawn from the notch 64 until the punch is withdrawn from the hole in the card, and therefore prevents the punch and its carriage C from being shifted by operation of their control means relatively to the card until the punch fully clears the hole in the card.

Figure 2:
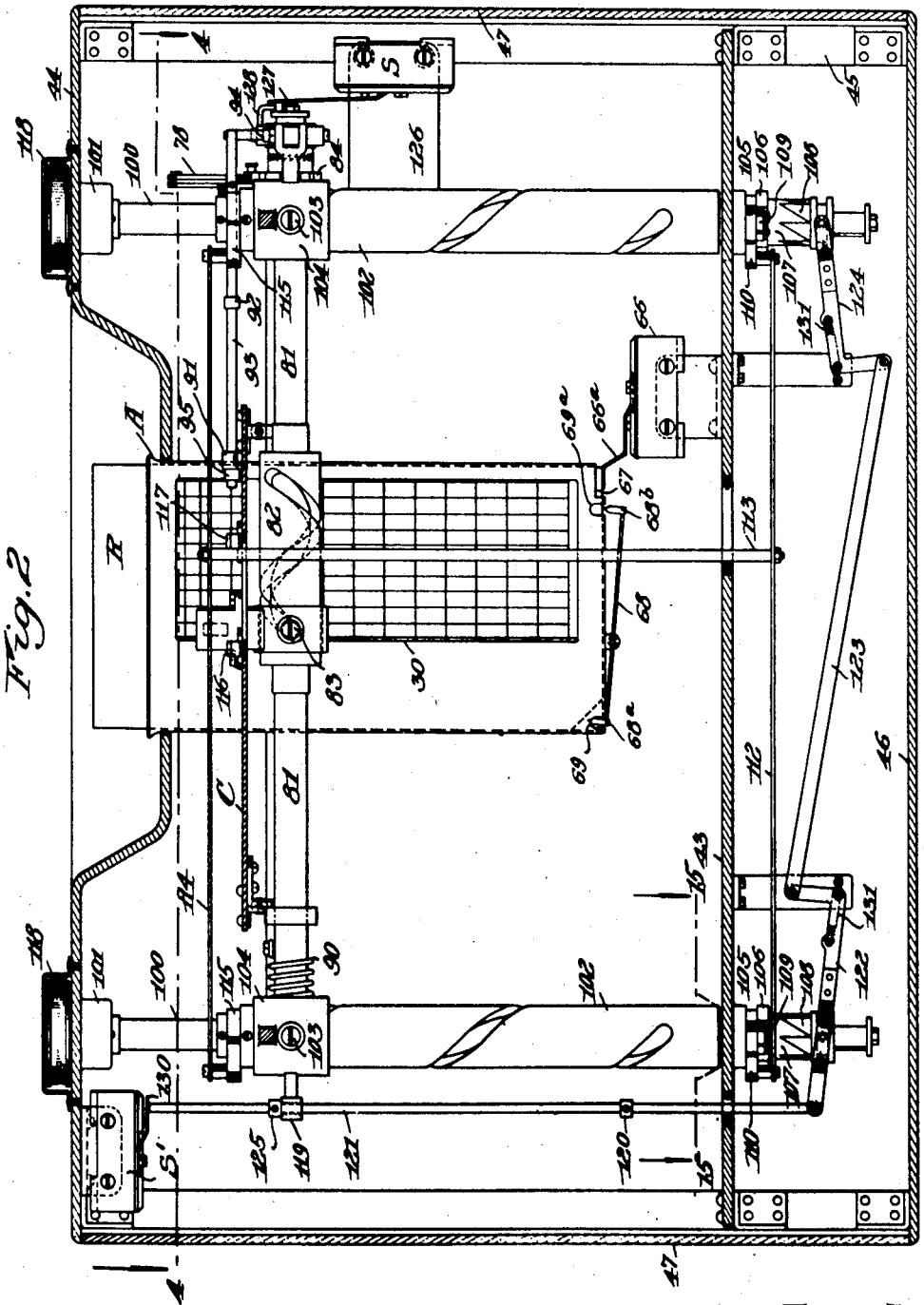
Fig. 2 is a sectional elevation of the apparatus on line 2—2, Fig. 4, showing the position of the parts for punching the record card to indicate the first time period.

In the embodiment of the invention shown in the drawings, see Figs. 2, 18 and 19, punching actuation of the punch is initiated by inserting a time card R in the holder A, the punch being actuated each time that a card is properly placed in the holder. For this purpose, as shown, the punch-actuating solenoid 50 is connected in an electric circuit 65, 65a with a micro or other suitable switch 66, the operating arm or member 66a of which, as shown in Fig. 2, is located adjacent to one bottom corner of the card holder. When there is no card in the holder, this switch 66 will stand open, as shown in Fig. 19, and break the operating circuit to prevent operation of the solenoid 50. But, when a card is fully inserted into the holder, one bottom corner of the card will protrude through an opening 67 in the corresponding corner of the holder and move the switch arm 66a, thereby closing the switch and energizing the solenoid and operating the punch to perforate the card. As shown, each record card has one bottom corner thereof cut off or removed, so that the switch 66 can only be closed and the punch operated when the record card or element is placed in the intended proper position in the holder.

Another function is served by this form of the record card or element. That is, it is sometimes desired to simultaneously produce duplicate records on two, or duplicate, cards, as for instance, on a production job card and on a workman's time card. In such case, if one of the cards is reversed or improperly placed in the holder, as shown in Fig. 18, the bottom corner thereof which is not cut off will engage a finger 68a on one end of a lever 68 which is pivoted between its ends on the bottom of the card holder and normally occupies the position shown in Fig. 2, with the finger 68a of the lever projecting into a notch 69 in the bottom corner of the holder opposite to the corner having the opening 67. If both cards are placed in the proper like positions in the holder, the cutaway corners of the cards will permit the lever 68 to retain this position, and the opposite unremoved corners of the cards will engage the switch arm 66a for closing the switch 66. If, however, either of the cards is placed in a reverse position in the holder, the unremoved corner of the reversed card will engage the finger 68a of the lever and depress it, thereby raising the finger 68b on the opposite end of the lever into engagement with the bottom edge of the card, through a notch 69a in the bottom of the holder, as shown in Fig. 18, and so prevent the card from being inserted fully into the holder, or far enough to close the switch 66 and effect a punch-operating energization of the solenoid 50.

As shown in Fig. 19, two safety switches or circuit closures S and S' are connected in series in the solenoid circuit 65, 65a. These switches are normally closed, as shown, and therefore do not interfere with the operation of the punch solenoid 50 by closing and opening the controlling switch 66, but said safety switches S and S' are adapted to function as safety devices, as hereinafter explained, to prevent possible operation of the punch during the return travels of either the punch carriage C or the main carriage D, in the event that a record card should be inserted in holder A at a time when any such return travel is occurring.

The punch carriage is shifted to locate the punch in different operative positions transversely of the record card, preferably by motor-actuated mechanism constructed as follows:

70 represents the operating motor which may be of any suitable sort, but as shown, consists of an electric solenoid adapted to be energized periodically or at uniform intervals under time control or according to a predetermined schedule of operation for causing successive step advance movements of the punch carriage, for example, every six minutes, or one-tenth of an hour. For this purpose the solenoid 70, see Fig. 20, is connected in an electric circuit 71 and 72 with a micro or other suitable switch 73, adapted to be closed and energize the solenoid 70 every six minutes, as by a disk 74, which revolves in synchronism with a clock or time mechanism of any suitable type, indicated conventionally at E, in Fig. 1. Disk 74 may be fixed on the minute hand shaft of the clock so as to make one complete revolution every hour, and said disk is provided circumferentially thereof with ten equally spaced projections or parts 74a which, during each revolution of the disk, successively engage and move an actuating arm 75 of switch 73, thereby operating the switch and closing the solenoid circuit to energize or operate the solenoid at regular six minute intervals. Preferably, the control switch 73 is adjustably mounted, as on a supporting bar 76 Fig. 1, adapted to be adjusted about the axis of disk 74 and to be releasably held in adjusted positions by a suitable detent or device 77, so that control switch 73 may be set to operate the solenoid one or more minutes ahead of or behind the times shown by the clock dial for the six minute solenoid-operating intervals, in conformity with the policy of the particular user of the apparatus. This adjusting means, if preferred, may be concealed within the clock.

As shown in Figs. 8-13, the core of the solenoid 70 is connected by a link 78 to the knee of a toggle joint 79—79a, one link of which is operatively connected to a ratchet mechanism 80 for intermittently turning a worm shaft 81 which is suitably journalled on the main carriage D parallel with the direction of travel of the punch carriage C, and is provided with a worm 82 operatively connected with the punch carriage so that rotation of the worm shaft produces transverse travel of the punch carriage on the main carriage D. As shown in Fig. 6, the worm passes through a sleeve 83 fixed on carriage C and having a stud equipped with an antifriction roller 83a engaging the helical groove of the worm for operatively connecting the worm with the carriage. Ratchet mechanism 80 comprises a ratchet wheel 84 mounted to turn freely on worm shaft 81 and releasably coupled thereto by a clutch comprising teeth on the hub of the ratchet wheel engaged with complementary teeth on a clutch sleeve 85 which is splined on worm shaft 81 to turn with the shaft but slide lengthwise thereof for coupling the ratchet wheel to and uncoupling it from the shaft. The ratchet wheel is rotated by a spring-pressed pawl 86 on a pawl lever 87 mounted beside the ratchet wheel to turn freely about worm shaft 81 and actuated by pivotal connection with the adjacent end of the toggle joint 79—79a, so that each time the solenoid 70 is energized, it will act through the toggle joint and ratchet mechanism to turn the worm shaft 81 a partial revolution. The pawl lever 87 is adapted to engage a fixed stop 88 on the carriage D to limit the length of each rotational movement of the ratchet wheel and the worm shaft 81 by the solenoid. A spring actuated holding dog 89 prevents reverse rotation of the ratchet wheel. Thus, successive operations of the solenoid 70 effect successive, equal, rotary movements of the worm shaft 81, each a fraction of one revolution of the shaft, and impart successive, equal step movements of the punch carriage in an advance direction, or to the right, as illustrated in the drawings, for shifting the punch to successive, uniformly spaced, operative positions in a line transversely across the face of the record card.

Figure 3:
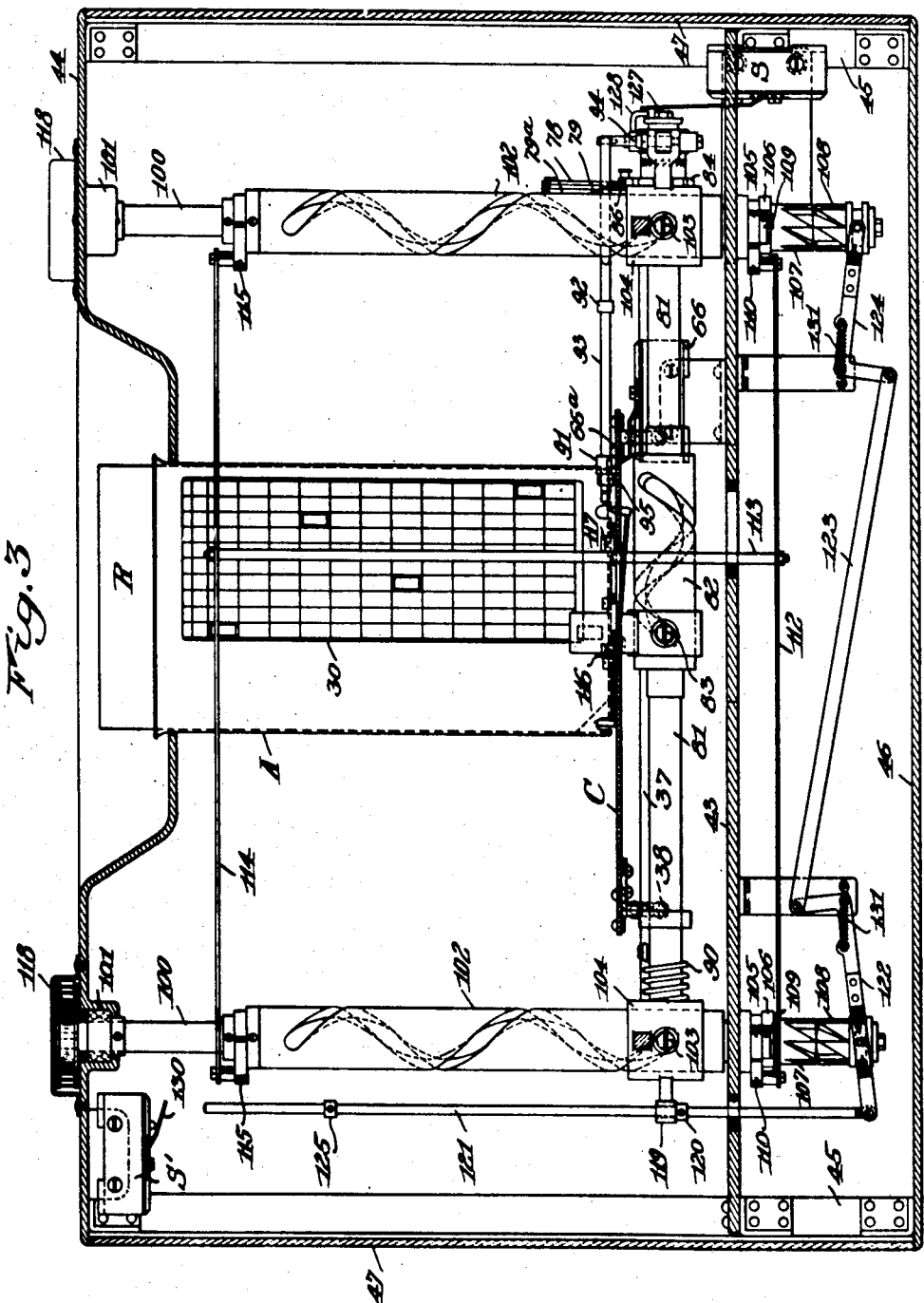
Fig. 3 is a similar view, but showing the position of the parts when the punch is at the end of its downward adjustment travel and ready to be returned to its initial position.
Figure 13:
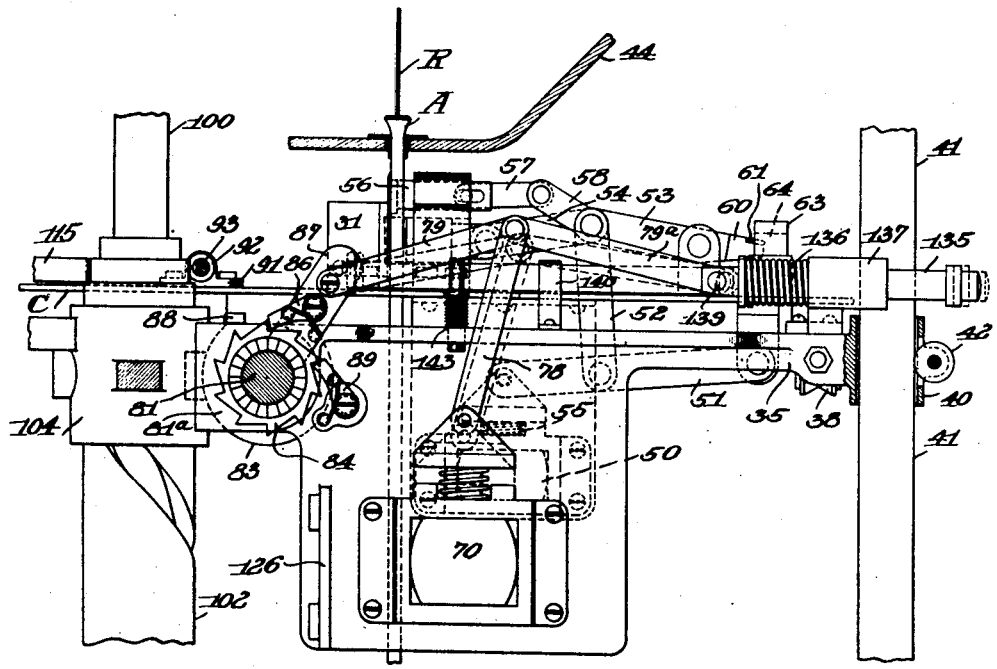
Fig. 13 is a sectional elevation of the same ratchet mechanism, showing the position of the parts when the punch is advanced and in a hole in the record card.
Figure 14:
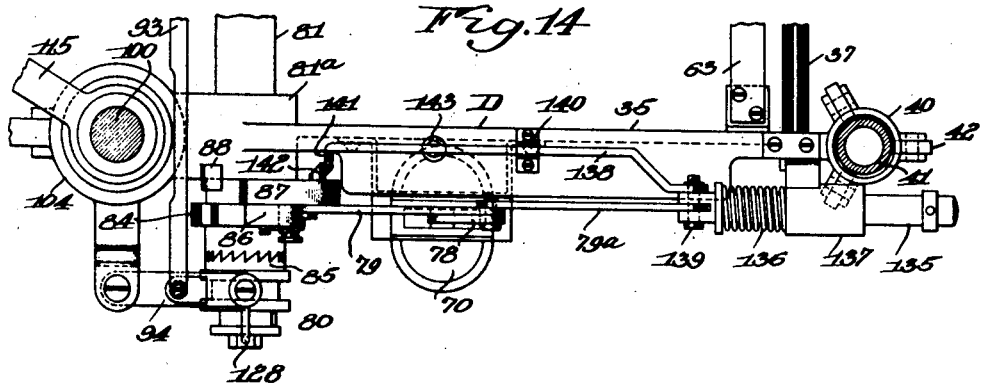
Fig. 14 is a sectional plan view of the parts shown in Fig. 13.

A suitable spring 90, Figs. 2-4, which may be coiled about the worm shaft 81 and anchored at opposite sides to the shaft and to an adjacent portion of the carriage D, is wound up by said intermittent rotary movements of the worm shaft. When punch carriage C reaches the limit of its advance travel, a trip member 91 on the carriage C engages a collar or projection 92 on a clutch-operating rod 93, connected by a pivoted lever or fork 94 with the clutch sleeve 85, and shifts the latter to uncouple the ratchet wheel 84 from the worm shaft 81. This frees the worm shaft, which is then reversely rotated by the spring 90 and effects a return or reverse travel of the punch carriage. At the end of this return travel, the trip member 91 on the carriage engages a second collar or projection 95 on the clutch-operating rod 93 and shifts the clutch rod to again couple the worm shaft to its actuating ratchet wheel, ready for another advance travel of the punch carriage.

The mechanism shown for producing the punch-adjusting up and down travel of main carriage D comprises two vertical worm shafts 100, see Figs. 2-8, which are journalled in suitable bearings 101 on the main frame and are provided with worms 102 operatively engaging parts of the carriage D, such as antifriction rollers 103, which are suitably mounted on sleeves 104 on the carriage slidably surrounding the worms, and engage in the helical grooves of the worms. Intermittent rotational movement of these worm shafts is effected by ratchet mechanisms 105, one for each worm shaft. Each ratchet mechanism shown comprises a ratchet wheel 106 rotatable about the lower portion of the worm shaft and releasably coupled thereto by a clutch device including hub teeth 107 on the ratchet wheel engaging complementary teeth on a clutch sleeve 108 which is splined to the worm shaft to turn therewith, but is slidable thereon for engaging and disengaging the clutch teeth. The ratchet wheel 106 is turned intermittently by a spring pressed pawl 109 on a pawl lever 110 which is suitably mounted to swing about the axis of worm shaft 100. A spring-actuated dog 111, Fig. 15, prevents reverse rotation of the ratchet wheel. The pawl levers 110 of the two ratchet devices 105 are connected to operate in unison, as by a bar 112 pivoted to said pawl levers. This bar 112, as shown, is joined to a parallel, horizontal bar 114, adjacent the punch carriage C, by a vertical connecting rod 113 which passes through suitable slots in the frame plate 43 and in the punch carriage C. Bar 114 is pivoted at opposite ends to supporting arms 115 which are suitably mounted on the upper portions of the worm shafts 100 to swing freely about the same. The parallel bars 112, 114 support the connecting rod 113 and maintain it always vertical in the different positions to which it is moved for actuating the ratchet mechanisms 105.

Fixed on the punch carriage C adjacent the opposite ends of the slot, through which rod 113 passes, are two actuating fingers 116 and 117. During each advance travel of the punch carriage, the finger 116 shifts the rod 113 and the connected bar 112, thus swinging the pawl levers 110 in their inactive direction, and during each return travel of the punch carriage C, finger 117 shifts rod 113 and swings the pawl levers 110 in the direction to turn the ratchet wheels of the two ratchet mechanisms 105, thereby turning the worm shafts 100 and lowering the main carriage D one step downward. Thus, during successive return travels of the punch carriage C, the ratchet mechanisms 105 are actuated and produce successive, uniform downward step advances of the main carriage D.

Suitable springs, as spiral springs 118 connected to the upper ends of the worm shafts, are wound up by the intermittent rotations of the shafts by the ratchet mechanism. When the main carriage D reaches the limit of its downward travel (see Fig. 3), a suitable member 119 on the carriage engages a collar or part 120 on a rod 121, preferably arranged parallel with and adjacent one of the worm shafts 100, and acting through said rod and a connected clutch lever 122, operates the clutch sleeve 108 to uncouple said worm shaft from its actuating ratchet wheel. Clutch lever 122 is connected, as by the rod 123 to a shifting lever 124 for the clutch sleeve of the ratchet mechanism for the other worm shaft 100, so that both worm shafts 100 are simultaneously uncoupled from their actuating mechanisms. When the worm shafts 100 are freed, they are reversely rotated by their springs 118, and cause upward or return travel of the main carriage. When the carriage approaches the limit of its upward travel, the trip member 119 engages a second collar or part 125 on rod 121 and moves the rod, thereby actuating the clutch levers 122, 124 to again couple the worm shafts to their actuating ratchet mechanisms when the carriage reaches its initial position, ready for again affecting the downward step movements of the carriage.

In this manner the punch carriage C is advanced by successive movements to advance the punch to uniformly spaced, successive, operative positions in a line transversely with reference to the record card, and after the last of these advance movements, the carriage actuating worm shaft 81 is uncoupled from its actuating mechanism and is reversely rotated to return the punch carriage. As the punch carriage approaches its initial position, it effects a partial rotation of the actuating worm shafts 100 for the main carriage D and lowers the main and punch carriages one step to a position for the punch carriage to be again advanced by successive steps in a new transverse line below the first line. The punch is thus moved to successive operative positions representing successive one-tenth hour periods in each of a succession of lines extending transversely of the record element, and representing successive hours, until the last position in the last transverse line is reached, when the punch will be returned to its initial position, ready to repeat such operation.

As hereinbefore mentioned, safety means, including the safety switches S and S' are provided for preventing operation of the punch B in the event that a record card or element is placed in the holder A during any return travel of either the punch carriage C or main carriage D. In the safety means as shown, the switch S may be mounted by a bracket 126 on the main carriage D with its actuating arm 127 in position to be operated by a finger or member 128, Figs. 2 and 5, which may be connected to the clutch lever 94 of the ratchet mechanism 80, so that when the lever is actuated for freeing the worm shaft 81 to effect the return of the punch carriage C, as before explained, finger 128 will move the switch arm 127 to break the operating circuit of the punch-actuating solenoid 50, and thus hold the circuit open and prevent operation of the punch until the worm shaft 81 is again coupled to the ratchet mechanism at the end of the return travel of the carriage.

The second safety switch S' may be suitably mounted on the main frame with its actuating arm 130 in position to be operated by the clutch-actuating rod 121. When this rod is in its normal position, shown in Fig. 2, with the worm shafts 100 coupled to their actuating ratchet mechanism 105 for effecting the advance movements of the main carriage, the rod 101 will act on the switch arm 130 to hold switch S' closed, and the punch solenoid 50 can be operated by its control switch 66, as before explained, but when rod 121 is shifted for uncoupling the worm shafts 100 from their actuating ratchet mechanisms, to permit the return travel of the carriage D, said rod will be disengaged from the switch-actuating arm 130 and permit the switch S' to open and break the operating circuit for the punch solenoid 50, so that it cannot be operated by actuation of its control switch 66. The circuit will remain open during the return travel of the carriage D until the rod 121 is returned to its normal position to again couple worm shafts 100 to their actuating ratchet mechanisms. This return movement of rod 121 closes switch S', and the rod 121 may be held in its normal position and retain the switch closed by suitable springs 131, Fig. 2, connected to the clutch levers 122 and 124. Thus, if a record card should be placed in the holder A during a return travel of either of the carriages C or D, the punch will not be operated until after such return travels are completed and the parts of the apparatus are in position for the normal operation thereof.

The safety switches S and S', as well as the control switches 66 and 73, are preferably spring-actuated, the spring of safety switch S acting to normally hold it closed, while the springs of the other switches act to open them when released by their actuating contact devices, which close the switches.

In the event that the time control mechanism should operate for shifting or adjusting the punch to a new operative postion any time while the punch B is in punching engagement with a card in the holder A, the punch could not be shifted to the new position without injury to the card or interference with the proper functioning of the apparatus. It is therefore important to prevent the shifting of the punch carriage until after the punch has been retracted clear of the card, but to then effect the shifting of the punch, which was prevented by the engagement of the punch with the card. Additional safety means are provided for this purpose which, as illustrated, are constructed as follows, see Figs. 9–14:

One link 79a of the actuating toggle of ratchet mechanism 80 for advancing the punch carriage, is fulcrumed at 135a on a plunger 135 which is held in the position shown in Figs. 9 and 10 by a coil spring 136 surrounding the plunger between an abutment thereon and a guide bracket 137 in which the plunger is slidable toward and from the ratchet device 80. This spring holds the fulcrum 135a for the toggle link normally in position to permit the normal operation of the ratchet mechanism 80, as before explained. However, if the solenoid 70 is operated while the punch and card clamp are in engagement with the card, the resistance to the turning of the ratchet wheel will hold the pawl lever 87 from movement, and the fulcrum plunger 135 will be moved outwardly, compressing the spring 136, to permit the straightening of the toggle by the actuation of the solenoid. An auxiliary ratchet-actuating bar 138 pivoted to the plunger 135 and extending loosely through a suitable guide 140 on the carriage D has a lateral finger 141 at its free end for cooperative engagement with a stud 142 on the pawl lever 87. A spring plunger 143 on which the bar 138 rests, permits a limited up and down movement as well as endwise movement of the bar 138 in its guide 140. The ends of the finger 141 and stud 142 on the pawl lever are preferably bevelled, and when the plunger 135 is moved outwardly and compresses the spring, as mentioned, the finger 141 of the auxiliary bar 138 is adapted to ride over the stud 142 to a position behind it, shown in Figs. 13 and 14. Then, when the punch B has been withdrawn from the hole in the record card, the solenoid 70 being deenergized at this time since the projection of the time-controlled disk 74 which produced the last actuation of the solenoid 70 will have passed and released the arm 75 of the solenoid control switch 73, the compressed spring 136 will expand and move the auxiliary actuating bar 138 forward and, by engagement of its finger 141 with the stud 142, will swing the pawl lever 87 and turn the ratchet wheel of mechanism 80 to cause the step advance movement of the carriage, which otherwise would have been effected by the last energization of the solenoid 70, or while the punch was in engagement with the record card. Thus, when the punch and card clamp have been retracted or freed from engagement with the card, the advance movement of the carriage will be effected through the medium of the spring 136 and the auxiliary actuating bar 138 instead of by the normal operation of the ratchet mechanism by solenoid 70. In such normal operation of the ratchet mechanism, the play permitted the bar 138 by its guide means, enables stud 142 of the pawl lever to pass back and forth over finger 141 of the bar 138.

In the use of the apparatus as illustrated and above described, if a workman inserts his time card or record element into the holder A when he starts work or begins a particular job and again at the end of his work period, or when the job is finished, the punch B will be operated, as explained, to punch holes in the card. The locations of the holes in the card, which are determined, as explained, by the time-controlled mechanism, will indicate respectively the starting and finishing times at which the card was punched. For instance, the punched card shown in Figs. 22 and 23, indicates, by the location of the first and second holes 140' and 141', that a job was begun at six (or 6.0) o'clock, and was finished at nine forty-two (or 9.7) o'clock. If now the timekeeper or clerk places the card in the alined position shown in Fig. 23, on the proper chart, shown in Fig. 21, with the first hole 140' of the card registering with the index mark 142' on the chart, then the chart figures 3.7 and 2.213 appearing through the second hole 141' of the card, show that the job occupied 3.7 hours, and the amount due therefor, at the indicated rate of $.625 per hour, is $2.213. If, as shown, the card is punched to indicate subsequent jobs, the hole 141', which indicates the finishing time for the first job, will also indicate the starting time for an immediately succeeding second job, and the third hole 143' will indicate the finishing time for the second job. So the elapsed time for the second job and the amount due therefor, can be readily ascertained in the same manner by placing the second hole 141' in register with the index mark of the chart, and the chart figures appearing through the third hole will show the elapsed time and wage due for the second job. Or, if the card is left with its first hole in register with the chart index mark, then the chart figures appearing through the third hole 144 of the card will be the total elapsed time and amount of wages due for both the first and second jobs. The elapsed time for any subsequent job and the wages due therefor can be ascertained in a similar manner by placing the card on the chart with the starting hole for the job in register with the index mark of the chart and reading the figures showing through the finishing hole for that job. Or the workman's total time wages due for all of the jobs, or for the day, is ascertained by placing the card on the chart with the first hole of the card in register with the chart index mark and reading the elapsed time and pay figures showing through the last hole 144 of the card.

Separate charts are provided for the various different rates of pay used by a concern, and it is only necessary for the clerk to use the chart for the particular rate of pay indicated on any card, in the manner explained, to ascertain the wages due any employee according to his rate of pay, as indicated on his time card. If a definite lunch hour is observed, the time and values for this period are omitted and a full day's time and wage may be determined at one reading.

It will thus be seen that the clerk only has to properly register a card on the appropriate chart and read the chart figures showing through the proper hole of the card to know the elapsed time and the value recorded, without any figuring or calculating on his part. Since the holes in the card for different times are located in different positions both transversely and longitudinally of the card, the punched holes can be made substantially the full size of the rectangular figure spaces of the card and chart. Therefore, the figures used on the chart can be large enough to be clearly legible and easily read through the punched holes of the card, while nevertheless the card can be of a conveniently small size, such as commonly employed for time or job cards. Since charts can be filed or preserved where they will not become soiled, mutilated or illegible, the described method in which the cards have the record holes through which the chart figures can be read directly, avoids objections which would apply if the time record were printed on the card, both for the reason that often the printing is not clear or distinct, and also because the cards are apt to be soiled or disfigured by handling so as to obscure the matter thereon. Furthermore, by the use of the time indicating holes punched through the card, it is possible to make identical, simultaneous records on multiple record elements, as time and job cards, by inserting the cards in the machine and punching them at the same time.

Distinct advantages are thus gained by the use of the record cards or elements punched with holes through which the figures of the chart can be directly read. Nevertheless my improved method and means of this application would still have various advantages if the records were made on the cards or elements by marking or other means of recording, in place of the record holes through the cards or elements, and my invention is not necessarily restricted in all its aspects to the punching or perforating of the record elements.

While the apparatus and method have been hereinbefore described as particularly intended for ascertaining elapsed time periods and their values, the method and apparatus are adapted for use for many other more or less analogous purposes. Time studies of many kinds or operating costs can be recorded and values determined. To illustrate, an expensive machine may not be operated continuously or at efficient capacity to be economical. It may be desired to determine its productive or unproductive time. For such purpose the switch 66 which controls the operation of the punching solenoid could, for instance, be attached to or operated by the machine so that the solenoid would be energized and the punch or marker actuated when the machine is producing and again when the production or operation is stopped, and the record element in the holder A would be punched or marked whenever the solenoid is energized. The record element with such record could then be placed in proper registration with an appropriate chart to obtain the time and cost of producing, and the idle or unproductive time and value of the machine.

I claim as my invention:

1. In an apparatus of the character described having a holder for a record element, and a marker, one of which elements is shiftable for placing the marker in different operative locations relatively to the record element, and means for causing the marking of said record element by said marker in any of said different operative locations, the improvement comprising a motor-driven mechanism which advances said shiftable element to different positions in one direction relatively across the face of the record element, a second mechanism which advances said shiftable element in a second direction relatively across the face of the record element, means operating when said shiftable element has advanced a predetermined distance in said first direction to reverse the travel of said shiftable element, means operating upon each reverse travel of said shiftable element to a predetermined position to actuate said second mechanism for advancing the shiftable element in said second direction, and means operating upon a predetermined advance of said shiftable element in said second direction to return the shiftable element to the initial position.

2. In an apparatus of the character described having a holder for a record element, and a marker, one of which elements is shiftable for placing the marker in different operative locations relatively to the record element, and means for causing the marking of said record element by said marker in any of said different operative locations, the improvement comprising a motor-driven mechanism operatively coupled to said marker for advancing the same to different positions in one direction across the face of the record element, a second mechanism operatively coupled to said marker for advancing the same in a second direction across the face of the record element, means operating when said marker has advanced a predetermined distance in said first direction to reverse its travel, means operating upon each reverse travel of said marker to a predetermined position to operate said second drive mechanism for advancing said marker in said second direction, and means operating when said marker element has moved a predetermined distance in said second direction to return the marker element to said initial position.

3. In an apparatus of the character described having a holder for a record element, and a marker, one of which elements is shiftable for placing the marker in different operative locations relatively to the record element, and means for causing the marking of said record element by said marker in any of said different operative locations, the improvement comprising a motor-driven mechanism operatively coupled to said marker for advancing the same to different positions in one direction across the face of the record element, a second mechanism operatively coupled to said marker for advancing the same in a second direction across the face of the record element, means operated by the travel of said marker a predetermined distance in said first direction to uncouple said mechanism from said marker, return means operating upon the uncoupling of the drive means to reverse the travel of said marker, means operating upon each reverse travel of said marker to a predetermined position to actuate said second drive mechanism for advancing said marker in said second direction, means operating upon a predetermined advance travel of said marker in said second direction to uncouple said marker from said second drive mechanism, and means operating upon the uncoupling of said second drive mechanism to return said marker to the initial position.

4. In an apparatus of the character described having a holder for a record element, and a marker, one of which elements is shiftable for placing the marker in different operative locations relatively to the record element, and means for causing the marking of said record element by said marker in any of said different operative locations, the improvement comprising a support for said marker element, a carriage on which said marker support is shiftable in one direction across the face of the record element, a driven mechanism operatively coupled to said marker support for shifting said support in an advance direction on said carriage, mechanism operatively coupled to said carriage for advancing the same in a direction at an angle to the direction of movement of the marker support on the carriage, means operating upon the advance travel of said marker support a predetermined distance to uncouple said first drive mechanism from said marker support, spring means operating upon the uncoupling of said drive mechanism to reverse the travel of said marker support, means operating upon each reverse travel of the marker support to a predetermined position to actuate said second drive mechanism to advance said carriage in said second direction, means operating upon a predetermined advance travel of said carriage to uncouple said second drive mechanism from said carriage, and spring means operating upon the uncoupling of said second drive mechanism to return said carriage to initial position.

5. In an apparatus of the character described having a holder for a record element, and a marker, one of which elements is shiftable for placing the marker in different operative locations relatively to the record element, and means for causing the marking of said record element by said marker in any of said different operative locations, the improvement comprising motor-actuated means for causing said marker to mark the record element, means for shifting said shiftable element in one direction, means operating upon a predetermined travel of said shiftable element in said direction to return said element to a starting position, and electrical means controlling said motor-actuated means and operating during the return travel of said marker element to prevent the operation of said motor-actuated means.

6. In an apparatus of the character described having a holder for a record element, and a marker, one of which elements is shiftable for placing the marker in different operative locations relatively to the record element, and means for causing the marking of said record element by said marker in any of said different operative locations, the improvement comprising motor-actuated means for causing said marker to mark the record element, means for shifting said shiftable element in one direction, means for shifting said shiftable element in a second direction, means operating upon a predetermined travel of said shiftable element in said first direction to return said element to a starting position, means operating upon a predetermined travel of said shiftable element in said second direction to return said shiftable element to the starting position, and electrical means controlling said motor-actuated means and operating during the return travels of the marker element to prevent operation of said motor-actuated means.

7. In an apparatus of the character described having a holder for a record element, and a marker, one of which elements is shiftable for placing the marker in different operative locations relatively to the record element, and means for causing the marking of said record element by said marker in any of said different operative locations, the improvement comprising a motor-driven mechanism operatively coupled to said marker for shifting the same to different positions relatively to the record element, means intermittently operating said motor to shift said marker, a locking device for holding said marker against shifting by said motor-driven mechanism during its record-marking operation, said mechanism including a spring-pressed member which is yieldable to prevent shifting of the marker by said mechanism while the marker is locked by said locking device, and said spring being placed under stress by such yielding of said member and acting upon the release of said locking device to actuate said member to shift said marker to a different operative relation to the record element.

8. In an apparatus of the character described having a holder for a record element, and a marker, one of which elements is shiftable for placing the marker in different operative locations relatively to the record element, and means for causing the marking of said record element by said marker in any of said different operative locations, the improvement comprising an intermittently operating motor, ratchet mechanism actuated by said motor for shifting said marker to different operative relations to the record element, a locking device which holds said marker from shifting during its record-marking operation, said ratchet mechanism including a spring which permits the ratchet-actuating element of said mechanism to yield to prevent operative action of the ratchet mechanism in the event of actuation of said motor during the holding action of said locking device, and said spring acting upon the release of said locking device to actuate said ratchet mechanism to effect the shifting of said marker.

9. An apparatus of the character described comprising a holder for a record blank, a punch, means for operating said punch to perforate a blank held by said holder, controlled mechanism including a motor-drive member operatively connected to said punch which shifts said punch to successive operative positions in a line extending transversely across said blank, means operating upon a predetermined travel of said punch in said line to uncouple said member from said motor and reverse the operation of said member to cause reverse travel of said punch and shift the punch longitudinally of said blank to the beginning of a new line, and means operating upon the return of the punch to again couple said member with said motor to repeat the shifting of the punch to successive positions in said new line extending transversely of said record blank.

10. An apparatus of the character described comprising a holder for a record blank, a punch, means for operating said punch to punch said blank, a worm operatively connected with said punch for shifting said punch to different positions in a line extending transversely of said record blank, a second worm operatively connected to said punch for shifting said punch relatively to said blank in a direction longitudinally of the blank, intermittently operated ratchet mechanism for turning said first worm in one direction to advance said punch in said transverse line, means operating upon a predetermined advance travel of the punch to uncouple said ratchet mechanism from said worm, a spring operating when said ratchet mechanism is uncoupled to reverse the rotation to said worm, a second ratchet mechanism operated at the end of each reverse travel of said punch for turning said second worm to advance said punch to successive positions longitudinally of said record blank, means for uncoupling said second ratchet mechanism from said second worm upon a predetermined advance travel of the punch longitudinally of said record blank, and a spring for reversely turning said second worm when uncoupled from its ratchet mechanism for returning said punch to the initial position longitudinally of said record blank.

11. In an apparatus of the character described having a holder for a record card, and means for marking a card in said holder, the improvement comprising a control device for said marking means adjacent said holder, said holder having an opening through which a card placed in a predetermined position in the holder engages and actuates said control device to operate said marking means, said card having a portion thereof removed, and a movable safety device having a part which when the card is in said predetermined operative position in the holder projects into a space formed in the holder by said removed portion of the card permitting the placing of the card in the predetermined position in the holder, said part of said safety device being engaged by a card reversely placed in the holder and the device being thereby moved to a position to block movement of the card to the predetermined position in the holder necessary to engage and actuate said control device, whereby said control device will not be actuated by a card improperly placed in the holder.

12. An apparatus of the character described comprising a holder for a record element, a punch, operating means for causing said punch to punch holes in a record element held by said holder, time-controlled mechanism which effects different operative positional relationships between said record element and punch predetermined by the different times at which said operating means are operated to thereby position successive punched holes in different relative locations on the record element depending upon the time elapsing between the particular times at which such successive holes are punched, and a chart bearing computed figures respectively indicating various different elapsed time values and positioned on the chart in different relative locations corresponding with the positions in which said time-controlled mechanism locates the holes in the record element to represent like time periods, whereby by placing said punched element in a prescribed registration with said chart, the figure showing the elapsed time value between a preceding hole and any succeeding hole in the record element is displayed through said succeeding hole of said record element.

13. An apparatus of the character described comprising a holder for a record element, a punch, means for operating said punch to punch holes in a record element held by said holder, time-controlled mechanism which effects different operative positional relationships between said record element and punch predetermined by the different times at which said operating means are operated to thereby position successive punched holes in different relative locations on the record element depending upon the time elapsing between the particular times at which such successive holes are punched, and a chart bearing computed figures respectively indicating various different elapsed time values and positioned on the chart in different relative locations corresponding with the positions in which said time-controlled mechanism locates the holes in the record element to represent like time periods, whereby by placing said punched element in a prescribed registration with said chart, the figure showing the elapsed time value between a preceding hole and any succeeding hole in the record element is displayed through said succeeding hole of said record element.

14. An apparatus of the character described comprising a holder for a record element, a punch, operating means for causing said punch to punch holes in a record element held by said holder, time-controlled mechanism which effects different operative positional relationships between said record element and punch in directions extending both longitudinally and transversely with reference to the record element predetermined by the different times at which said operating means are operated to thereby position successive punched holes in different relative locations on the record element depending upon the time elapsing between the particular times at which successive holes are punched, and a chart bearing computed figures respectively indicating various different elapsed time values and positioned on the chart in different relative locations corresponding with the positions in which said time-controlled mechanism locates the holes in the record element to represent like time periods, whereby by placing said punched element in a prescribed registration with said chart, the figure showing the elapsed time value between a preceding hole and any succeeding hole in the record element is displayed through said succeeding hole of said record element.

15. An apparatus of the character mentioned comprising a holder for a record element, a punch, means for operating said punch to punch holes in a record element held by said holder, time-controlled mechanism which shifts said punch relatively to said record element to effect different operative positional relationships between said record element and punch predetermined by the different times at which said operating means are operated to thereby position successive punched holes in different relative locations on the record element depending upon the time elapsing between the particular times at which such successive holes are punched, and a chart bearing computed figures respectively indicating various different elapsed time values and positioned on the chart in different relative locations corresponding with the positions in which said time-controlled mechanism locates the holes in the record element to represent like time periods, whereby by placing said punched element in a prescribed registration with said chart, the figure showing the elapsed time value between a preceding hole and any succeeding hole in the record element is displayed through said succeeding hole of said record element.

16. An apparatus of the character described according to claim 12, in which means controlled by the placing of a record element in said holder causes said punch to punch holes in the record element.

17. An apparatus of the character described comprising a holder for a record element, a marker, operating means for causing said marker to mark a record element held by said holder, time-controlled mechanism which effects different operative positional relationships between said record element and marker predetermined by the different times at which said operating means are operated to thereby position successive marks made by the marker in different relative locations on the record element depending upon the time elapsing between the particular times at which such successive marks are made, and a chart bearing computed figures respectively indicating various different elapsed time values and positioned on the chart in different relative locations corresponding with the positions in which said time-controlled mechanism locates the marks on the record element to represent like time periods, whereby by placing said marked element in a prescribed relation to said chart with any preceding mark of the element in register with an index point on the chart, the chart figure registering with any succeeding mark of the record element will directly show the value of the elapsed time between said preceding and succeeding marks of the record element.

18. An apparatus of the character described comprising a marker, operating means for causing said marker to mark a record blank, means acting automatically according to a predetermined control schedule which effects different operative positional relationships between said record blank and marker predetermined by the difference according to said schedule occurring between successive operations of said operating means, to thereby position successive marks made by the marker in definite different relative locations on the record blank according to the operating schedule of said control means, a chart bearing figures respectively showing various different values computed according to said schedule and a given factor, and positioned on the chart in different relative locations corresponding with the positions in which said control means locates the marks on the blank to represent like values, whereby by placing said blank in a prescribed relation to said chart with any preceding mark of the blank in register with an index point on the chart, the chart figure registering with any succeeding mark of the blank will directly show the value according to said schedule represented by the particular relative locations of said preceding and succeeding marks of the blank.

19. In an apparatus of the character described comprising a record element having arranged in one direction crossing said element a succession of spaces representing successive hours of time and which several hour spaces provide in a direction extending transversely of said first mentioned direction successive equal spaces representing like fractions of each hour, whereby spaces which represent different times in hours and said hour fractions are located in different positions on said record element longitudinally and transversely thereof, time-controlled mechanism for automatically marking said record element at successive different times in the particular spaces respectively representing such different times, and a cooperating chart bearing numbers in spaces arranged on the chart correspondingly to said hour and fractional hour space arrangement of said record element, the number in each chart space being a computation of the time represented by said space with a given factor, whereby by placing said marked element in a prescribed relation to said chart with any preceding marked space of the record element in register with an index space of the chart, the chart figure registering with any succeeding marked space of the record element will be the computed amount of the elapsed time between said preceding and succeeding record element spaces with said given factor.

20. An apparatus of the character described comprising a record element, and a marker element one of which elements is shiftable for placing the marker in different operative positions relatively to the record element, means for causing the marker to mark said record element in any of said different operative positions, time-controlled mechanism which advances said shiftable element in succession in accordance with the passage of time to successive uniformly spaced operative positions in one after another of successive parallel rows crossing said record element for causing successive marks made by said marker on said record element to be located in different relative positions on the record element depending upon the particular times at which said succeeding marks are made, and a chart bearing numbers respectively showing computations of different elapsed time periods with a given factor and located on the chart in different relative positions corresponding with the positions in which said time-controlled mechanism locates said marks on the record element to represent like elapsed time periods, whereby by placing said marked element in a prescribed relation to said chart with any preceding mark of the element in register with an index point of the chart, the chart number registering with any succeeding mark of the record element will be the amount of the time elapsed between said preceding and succeeding marks of the record element computed with said given factor.

21. In an apparatus of the character described having a record element, and a punch element, one of which elements is shiftable for placing the punch in different operative positions relatively to the record element, and means for causing the punch to make holes through said record element in any of said different operative positions, the improvement comprising controlled means which advances said shiftable element in succession to successive uniformly spaced operative positions in one after another of successive lines extending in a direction crossing said record element according to a schedule predetermined by said control means to locate successive holes made at different times in definite different relative positions on said record element determined by said control schedule, a chart bearing figures respectively showing different values computed according to said schedule and a given factor, and positioned on the chart in different relative locations corresponding with the positions in which said control means locates the holes on the record element to represent like values, whereby by placing said record element in a prescribed relation to said chart with any preceding hole of the record element in register with an index point on the chart, the chart figure registering with any succeeding hole of the record element will directly show the value according to said schedule represented by the particular relative positions of said preceding and succeeding holes of the record element.

ASA W. WALKER.

REFERENCES CITED

The following references are of record in the file of this patent:

UNITED STATES PATENTS

| Number | Name | Date |
|---|---|---|
| 1,019,290 | Albree | Mar. 5, 1912 |
| 1,105,994 | Nichols | Aug. 4, 1914 |
| 1,124,649 | Hill | Jan. 12, 1915 |
| 1,319,914 | Tallmadge | Oct. 28, 1919 |
| 1,558,743 | Merriman | Oct. 27, 1925 |
| 1,737,863 | Noonan | Dec. 3, 1929 |
| 2,294,739 | Connolly | Sept. 1, 1942 |
| 2,312,137 | Watson | Feb. 23, 1943 |